United States Patent
Hobenshield et al.

(10) Patent No.: US 8,437,920 B2
(45) Date of Patent: May 7, 2013

(54) DUAL MONITOR INFORMATION DISPLAY SYSTEM AND METHOD FOR AN EXCAVATOR

(75) Inventors: Lane Colin Hobenshield, Oak Creek, WI (US); Wayne G. Chmiel, Wind Lake, WI (US)

(73) Assignee: Caterpillar Global Mining LLC, South Milwaukee, WI (US)

( * ) Notice: Subject to any disclaimer, the term of this patent is extended or adjusted under 35 U.S.C. 154(b) by 362 days.

(21) Appl. No.: 12/793,774

(22) Filed: Jun. 4, 2010

(65) Prior Publication Data
US 2011/0301817 A1  Dec. 8, 2011

(51) Int. Cl.
*G06F 7/70* (2006.01)
(52) U.S. Cl.
USPC ........................... 701/50; 340/438; 340/691.6
(58) Field of Classification Search .................... 701/50; 340/438, 691.6
See application file for complete search history.

(56) References Cited

U.S. PATENT DOCUMENTS

| | | | |
|---|---|---|---|
| 7,605,692 B2 | 10/2009 | Yamada et al. | |
| 2004/0210847 A1* | 10/2004 | Berson et al. | 715/788 |
| 2005/0000703 A1* | 1/2005 | Furuno et al. | 172/2 |
| 2006/0200283 A1* | 9/2006 | Furuno et al. | 701/29 |
| 2009/0223092 A1 | 9/2009 | Harber et al. | |
| 2009/0224898 A1* | 9/2009 | Graeve et al. | 340/438 |
| 2009/0259401 A1* | 10/2009 | Edwards et al. | 701/301 |

FOREIGN PATENT DOCUMENTS

| | | |
|---|---|---|
| JP | 09-095982 | 4/1997 |
| JP | 2002-275949 | 9/2002 |
| JP | 2005-188156 | 7/2005 |
| JP | 2006-016916 | 1/2006 |
| JP | 2010-168746 | 8/2010 |
| JP | 2989529 | 3/2012 |

OTHER PUBLICATIONS

International Search Report and Written Opinion for Application No. PCT/US2011/037768, mail date Jan. 18, 2012, 6 pages.

* cited by examiner

*Primary Examiner* — Ryan Zeender
*Assistant Examiner* — Hunter Wilder
(74) *Attorney, Agent, or Firm* — Foley & Lardner LLP

(57) ABSTRACT

The operator of a excavator sits in a seat that has a one computer monitor on the left side and another computer monitor on the right side. A control system produces first and second sets of information regarding operation of the excavator with the first set of information being particularly relevant to the digging operation. The selection of which computer monitor displays which of the first and second sets of information depends on a direction that the excavator swings between a digging site and a dumping site and that selection changes as the direction changes. This presents the first set of information on the computer monitor that is easily observable by the excavator operator during the digging operation.

16 Claims, 4 Drawing Sheets

DUAL MONITOR INFORMATION DISPLAY SYSTEM AND METHOD FOR AN EXCAVATOR

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to excavators, such as power shovels used in mining; and more particularly to operator controls for operating the excavator.

2. Description of the Related Art

A typical mining power shovel includes a turntable mounted on a crawler assembly and the turntable supports an A-frame and a body that houses electrical controls and mechanical components. A boom, extending from the turntable, has an upper end supported by the A-frame and pivotally supporting a dipper handle that pivots in a vertical plane. A dipper, fixed to a distal end of the dipper handle, is raised and lowered by a hoist cable which extends from a drum in the body, over a sheave at the top of the boom, and down to a padlock on the dipper. Winding and unwinding the hoist cable on the drum moves the dipper vertically. A crowd assembly extends and retracts the dipper handle to provide the horizontal component, or crowd, of the dipper's movement. The dipper has a bottom door held closed by a latch, which is operated from the body by a cable. Releasing the latch allows to door to open by gravity, thereby dumping contents of the dipper. Moving the dipper toward the ground causes the door to swing closed and engage the latch.

Operation of the power shovel is controlled from a cab on the body. The shovel operator sits in a seat in the cab and manipulates controls that activate the different functions on the power shovel. A control panel adjacent to the seat contains manual control devices and indicators associated with functions of the power shovel.

During excavation, the power shovel digs material from the earth and deposits the material into dump trucks that drive along either side of the shovel. Thus the power shovel swings back an forth between the dig site and the location of the dump trucks. As the mining shovel swings, the operator looks out a window of the cab in the direction in which the shovel is moving. At the same time the operator also has to observe operating parameters of the power shovel that are displayed on an indicator panel. For example, some of the indicators designate the amount of material in the dipper and the amount of material that has been deposited in the dump truck being loaded presently.

Depending on whether the power shovel is swinging to the right or left between the dig site and the dump truck, the operator is looking in that direction. However, the control devices and operating parameter indicators heretofore were located in fixed positions on the control panel and not always in the same direction in which the operator was looking. Therefore in order to observe those indicators or operate a control device, the operator often had to turn away from the direction that the power shovel was swinging. This repetitive turning motion not only was tiresome, it caused the operator to look away from the direction of the swing. Regardless of their position in the cab, the indicators and control devices on the control panel never were located optimally for both swing directions.

SUMMARY OF THE INVENTION

An operator display system is provided for a excavator that swings left and right between a digging site and a dumping site. A first display device is located on a left side of the operator seat, and a second display device is located on a right side of the operator seat. A control system is connected to the first and second display devices and generates a first set of information related to operation of the excavator and a second set of information related to operation of the excavator. An arrangement responds to an input signal by dynamically selecting on which of the first and second display devices the first set of information is displayed and on which of the first and second display devices the second set of information is simultaneously displayed.

In one embodiment of the operator display system, the input signal is provided in response to the direction that the excavator swings. The control system knows when the excavator is position at the dumping site based on when a load is dumped from a dipper of the excavator. The swing thereafter is in a direction toward the digging site. Therefore, operator commands to the control system that designate load dumping and excavator swing are translated into the input signal that is applied to the arrangement that selects the display devices.

DETAILED DESCRIPTION OF THE PREFERRED EMBODIMENTS

Figure 1:
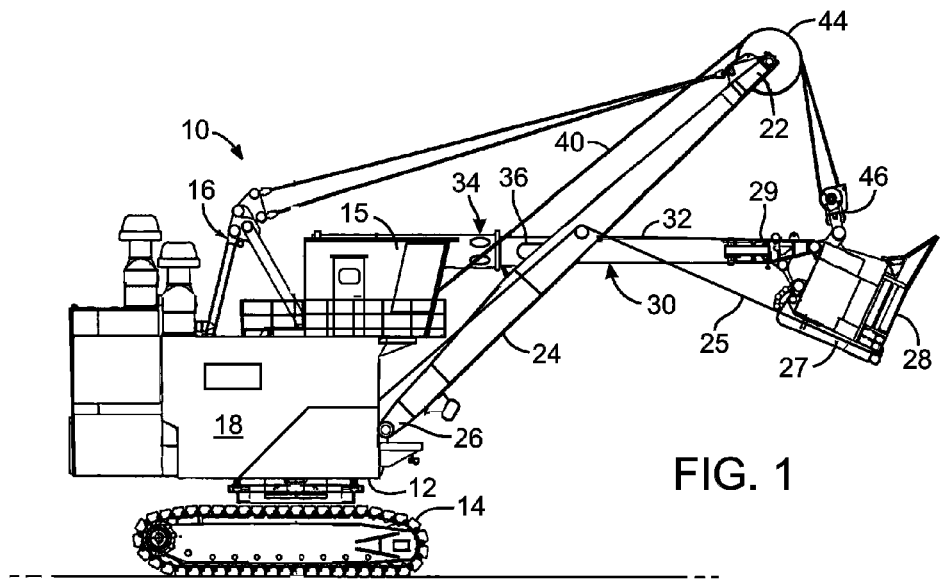
FIG. 1 is a side elevational view of a power shovel type excavator that incorporates the present invention.

FIG. 1 illustrates a power shovel 10 for mining use which is one type of excavator on which the present dual touch screen display system can be used. Other types of excavators include draglines and hydraulically powered shovels for example. The power shovel 10 includes a turntable 12 mounted on a crawler assembly 14 and supporting an A-frame 16 and a body 18. The crawler assembly 14 has a pair of tracks that are driven by separate motors to propel the power shovel 10 across the ground. The body 18 has a swing motor assembly that when activated causes the body to rotate relative to the crawler assembly 14. This allows the upper components of the power shovel to swing left and right between digging and dumping locations.

The body 18 houses equipment that includes an electrical control system that operates the power shovel components in response to inputs from the operator and from automatic devices, such as limit switches, pressure switches, temperature switches, other sensors, and the like. A cab 15 is located on top of the body and provides an enclosure in which the operator sits to control the power shovel 10.

The A-frame 16 supports a top end 22 of a boom 24, the bottom end 26 of which is supported by the turntable 12. A dipper 28 is mounted on the front end 29 of crowd assembly 30 that comprises a dipper handle 32 and a saddle block 34 that move telescopically when driven by an internal double acting hydraulic actuator. The saddle block 34 is pivotally attached to the boom 24 by a yoke 36, so as to rotate in a vertical plane. A hoist cable 40 extends upward from a motor driven hoist drum within the body 18, over a sheave 44 at the top end 22 of the boom 24, and down to a padlock 46 on the dipper 28. The hoist cable 40 provides for the vertical, raising and lowering, movement of the dipper 28. Other types of excavator may have a bucket, instead of the dipper with a door. Thus the term "load carrier" is used herein to refer generically toe dippers, bucket and other components that are mounted on a excavator for carrying a load.

Figure 2:
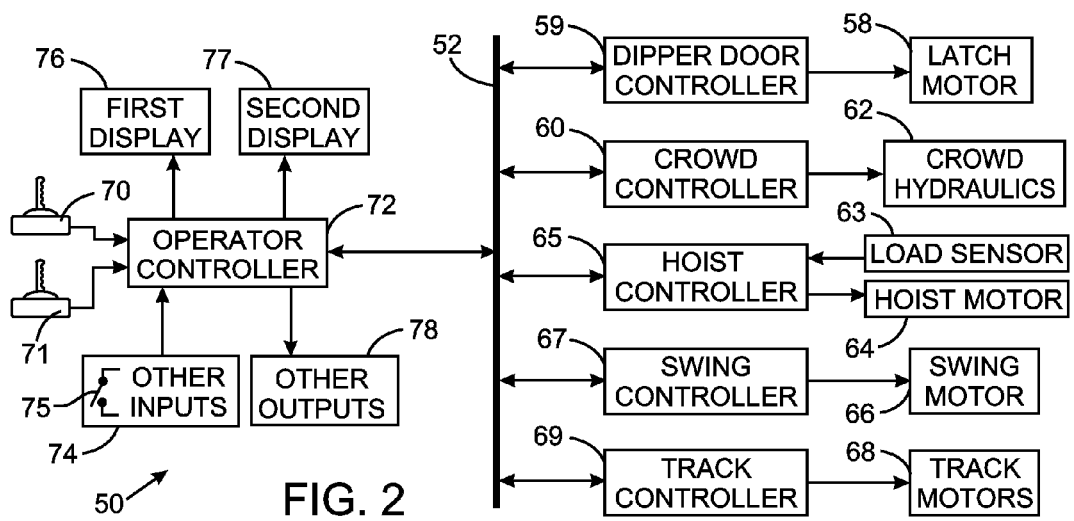
FIG. 2 is block schematic diagram of an exemplary computerized control system for the power shovel.

With reference to FIG. 2, the components of the power shovel 10 are operated by an electrical control system 50 that has a plurality of computerized controllers connected together by a conventional network 52 in order to exchange commands, data, and other messages. For example, the latch on the dipper door 27 is operated by a latch motor 58 within the shovel body 18 that pulls on a cable 25 which releases the dipper door latch. The latch motor 58 is operated by a dipper door controller 59 that receives instructions via the network 52. Similarly, the hydraulic cylinder within the crowd assembly 30 is controlled by a crowd controller 60 that operates a crowd hydraulic system 62 to extend and retract the dipper handle 32 into the saddle block 34. The dipper 28 is raised and lowered by a hoist motor 64 that rotates the hoist drum to wind and unwind the hoist cable 40. The direction and speed at which the hoist motor 64 operates is governed by a hoist controller 65. The hoist controller 65 receives an input signal from a load sensor 63 that measures a force acting on the boom 24 from which force the weight of the load in the dipper 28 can be calculated. As noted previously, the body 18 can rotate on the crawler assembly 14. That rotation is driven by a swing motor 66 which is activated by a swing motor controller 67. The tracks of the crawler assembly 14 are driven bidirectionally by separate track motors 68 operated by a track controller 69.

As noted previously, the shovel operator sits within the cab 15 on top of the body 18 and manipulates a pair of dual axis joysticks 70 and 71 that provide input signals to an operator controller 72. The operator also activates other input devices 74 to provide additional control signals to the operator controller 72. The cab 15 has output devices and indicators which provide the operator with information to the operator about the functioning of the shovel. As will be described in greater detail, the operator controller 72 is interfaced to a first computer monitor 76 and a second computer monitor 77, also referred to generically as display devices. Both computer monitors preferably have touch screens that, in addition to displaying information, allow the operator to touch specific areas of the screen to select different functions and parameters for the shovel operation. Other output devices 78, such as indicator lights and gauges, are connected to the operator controller 72 to provide additional information to the shovel operator. The operator controller 72 also receives other data and input signals from the network 52.

The operator controller 72 responds to the signals from the operator input devices and the network 52 by producing commands that are sent via the network to the appropriate other controllers in order to govern operation of their respective motors and other devices. In addition, those other controllers send information via the network 52 back to the operator controller 72 indicating the status of the respective shovel components. This information can then be utilized to control various display and output devices for the operator.

Figure 3:
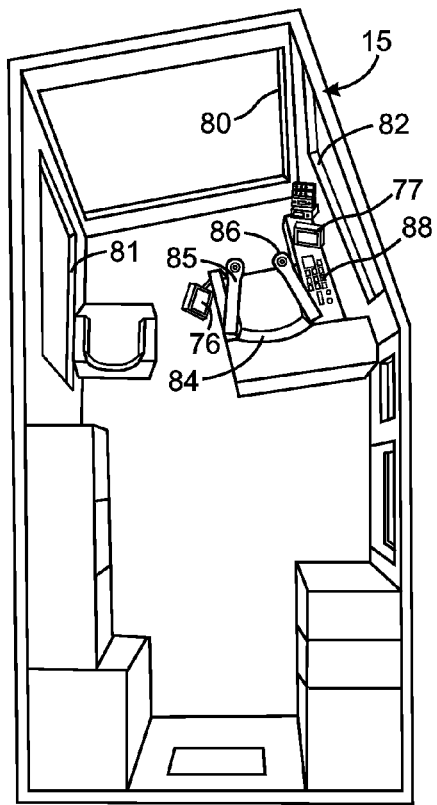
FIG. 3 is a view from the ceiling of an operator cab of the power shovel showing an operator seat and two display monitors.
Figure 4:
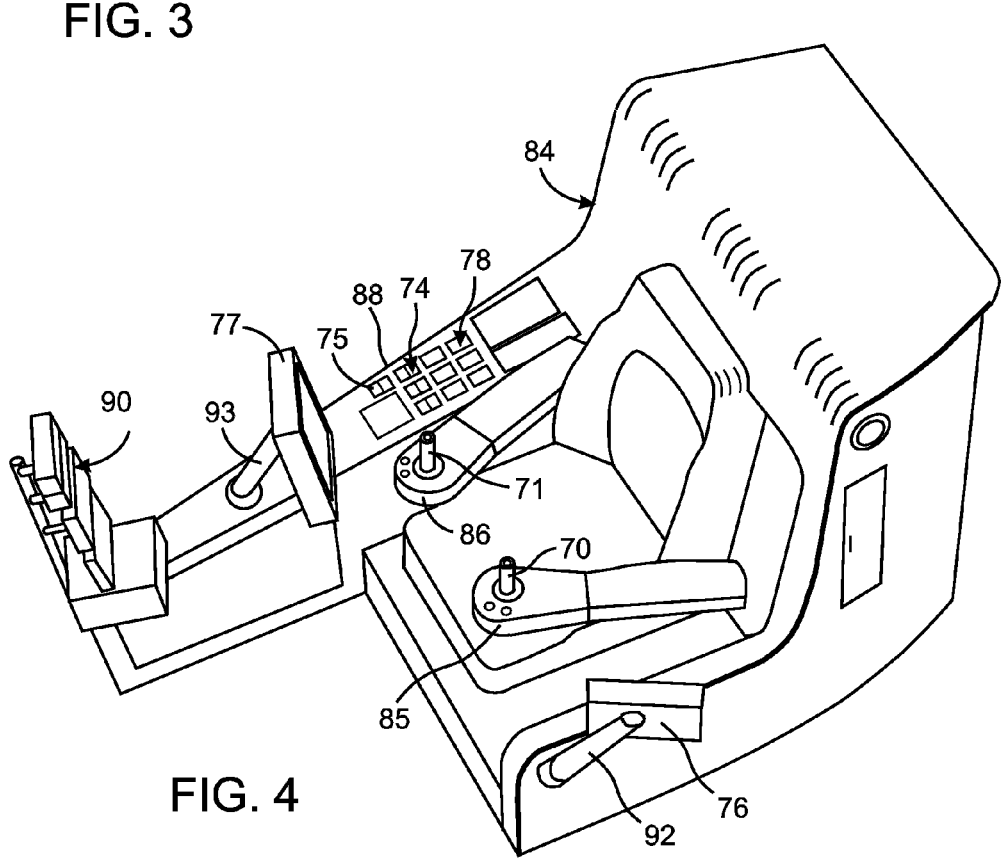
FIG. 4 is perspective view of the operator seat in the cab.

With reference to FIGS. 3 and 4, the power shovel's cab 15 has a large front window 80 and left and right side windows 81 and 82. An operator seat 84 is located near the front of the cab in a position at which the operator can look out the front and side windows 80-82. The seat 84 has a pair of arm rests 85 and 86 which are pivotally attached at their rear ends to the body of the seat and are able to swing left and right to accommodate the operator. The first joystick 70 of the control system 50 is located at the front end of the left arm rest 85 and the second joystick 71 is similarly located on the right arm rest 86. Pushbutton switches are located adjacent each of those joysticks. When the operator is in the seat 84 his or her hands are able to manipulate the joysticks and the adjacent pushbutton switches with his/her hands.

A console 88 is located on the right side of the seat 84 and contains many of the other input devices 74 and other output devices 78 of the control system 50. At the front end of the console 88 are several radios 90 used by the operator to communicate with the drivers of the dump trucks and with other workers.

The first computer monitor 76 is located on a pedestal 92 that projects upward from the right sidewall of the operator's seat 84. The first computer monitor 76 is pivotally mounted to that pedestal so that it may be adjusted in three dimensions for optimum viewing by the operator. The second computer monitor 77 is pivotally mounted on a similar pedestal 93 which extends upward from the console 88. The second computer monitor 77 likewise can be adjusted on the pedestal 93 in three dimensions for optimum viewing. The computer monitors 76 and 77 may be any of several types of display devices, such ones having a cathode ray tube, liquid crystal display (LCD) screen, light emitting diode (LED) screen, or a plasma display device, for example. Although the first and second computer monitors 76 and 77 are being described herein as having a touch screen that also acts as an input device, non-touch screen display devices may be used.

Different information is displayed on the first computer monitor 76 from the information displayed on the second computer monitor 77. Typically, one of the touch screen computer monitors is used to display controls which the operator needs to be able to activate regardless of the operating mode of the power shovel. The other computer monitor can be used to display different types of information as selected by the operator. For example, when the shovel is actively digging, the touch screen of this latter computer monitor typically is configured to present operating parameters related to the digging task, as will be described in greater detail.

Figure 5:
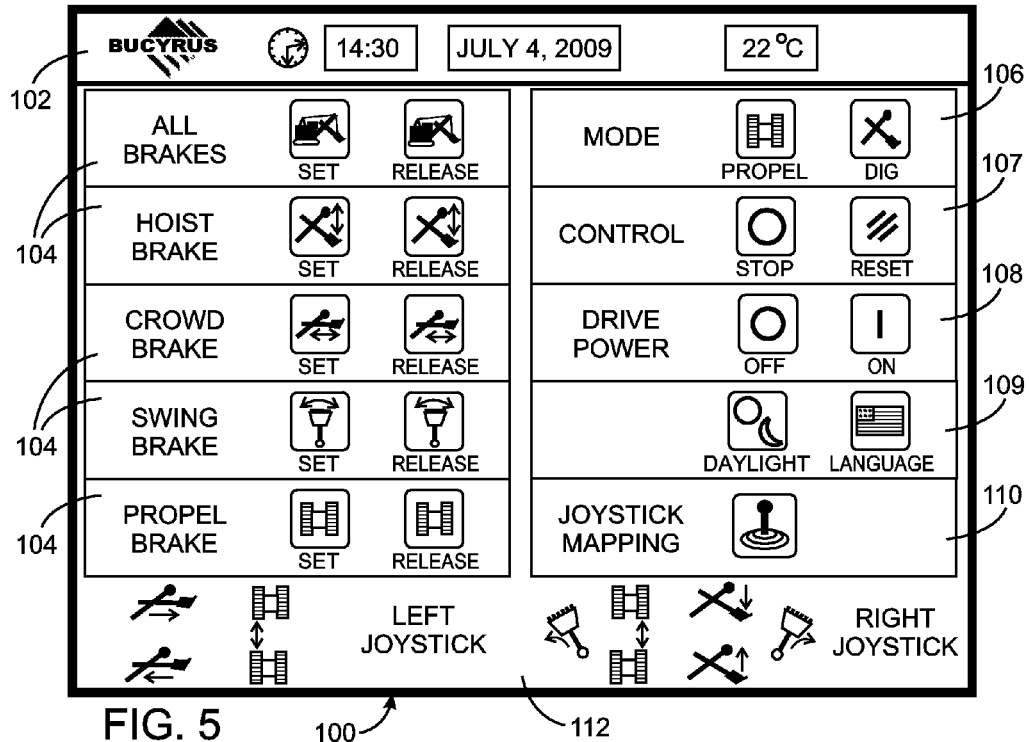
FIG. 5 depicts a touch screen of one display monitor in the operator cab that shows icons for controlling the power shovel.

FIG. 5 depicts a display of a set of information pertaining to controlling functions of the power shovel 10 and that information is presented on one of the first and second computer monitors 76 and 77. This exemplary control display 100 has a header 102 at the top which presents the time of day, date and inside cab temperature. Beneath that header is a section on the left side which presents a plurality of subsections 104 for operating the different brakes on the power shovel 10. The topmost subsection controls all the brakes simultaneously, whereas the four lower subsections are related to the individual brakes for specific shovel functions. For each brake function, there are separate icons for setting and releasing the respective brake. The shovel operator is able to touch one of those icons and the touch screen of the computer monitor responds by sending the signal to the operator controller 72 indicating the location on the screen that was touched. Conventional touch screen software converts that touch location into the appropriate brake command. Thus the icons on the control display 100 function as switches for operating the associated shovel functions.

On the right side of the exemplary control display 100 are several additional sections 106-110 which provide icons for controlling other functions of the power shovel 10. Section 106 selects either the propel mode or the dig mode. In the propel mode, the joysticks 70 and 71 control the tracks of the crawler assembly 14 to move the power shovel along the ground, whereas in the dig mode the crawler assembly 14 remains stationary and the joysticks control motion of the dipper 28. A master stop and reset control section 107 is provided, along with controls to turn the drive power on and off in section 108. Activation of exterior lights on the shovel for nighttime operation and the language that used on the displays are selected in section 109. Section 110 allows the operator to select which of the different joystick axes control which functions of the power shovel. For example, the front and back motion of the right joystick 71 can be assigned to raise and lower the dipper 28 for digging, and then to propel the shovel, that joystick motion is assigned to operate the right track motor of the crawler assembly 14. The section 112 at the bottom of the control display 100 illustrates the function that each axis of the left and right joystick 70 and 71 has depending upon whether the shovel is in the propel or dig mode.

Figure 6:
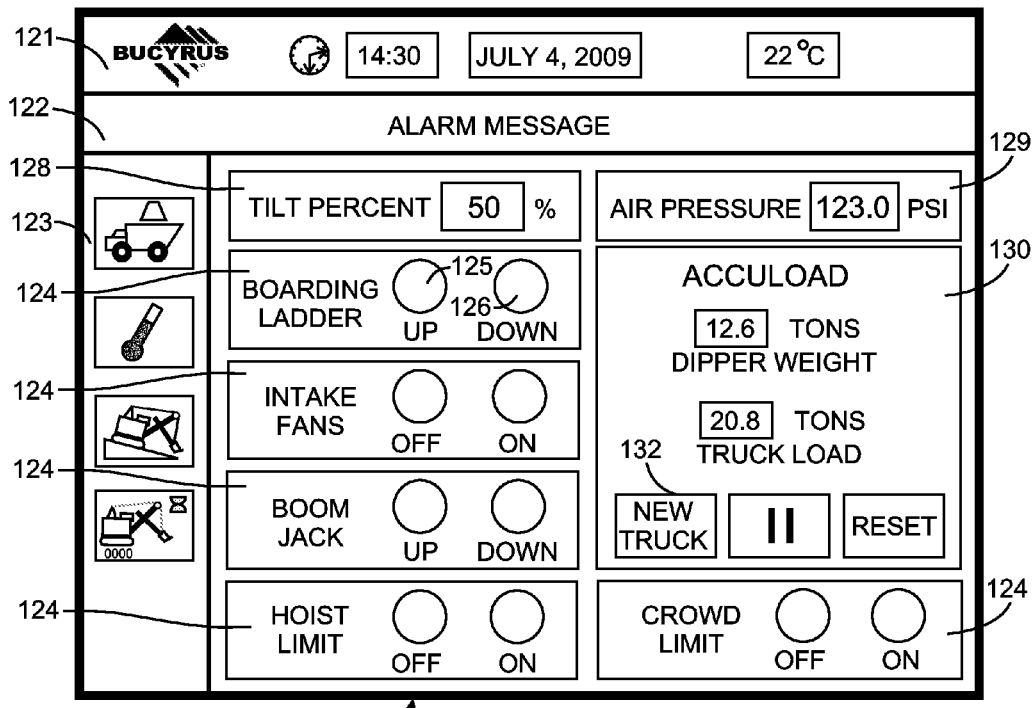
FIG. 6 depicts a touch screen of the other display monitor that shows operating parameters and control icons for the power shovel.

FIG. 6 depicts an exemplary indicator display 120 on the other computer monitor 76 or 77 which is user configurable to display several different sets of information based on the desires of the operator and the particular operations being performed at any given time. This indicator display 120 has a header 121 as in the display in FIG. 5. Beneath the header is an area 122 for displaying alarm and warning messages regarding conditions of the power shovel which require the operator's attention. Along the left side of the display there below are a plurality of selector icons 123 for selecting the particular set of information to display on the remainder of the monitor screen. Examples of such information sets include the weight of the dipper and the dump truck load, incline of the shovel, temperatures of important components, and operating times. Touching one of these selector icons 123, causes the associated set of information to be presented on the remainder of the monitor screen, i.e. the lower, right two-thirds of the screen.

Of particular relevance is the configuration of the display on a computer monitor during the digging mode which is depicted in FIG. 6. In this configuration, the lower right of the display contains a plurality of areas 124 that display the present state of different power shovel components. For example, indicators 125 and 126 respectively designate whether a boarding ladder on the outside of the power shovel by which workers climb onto the body 18 is in the raised or lowered position. The indicator display 120 also has sections 128, 129 and 130 that display operating parameters related to digging and dipper unloading. For example, section 128 displays the amount that the shovel is tilted front to back and section 129 displays the air pressure in the pneumatic system of the power shovel. A larger section 130 displays the weight of the material in the dipper 28 and a cumulative weight of dipper loads that have been placed into the dump truck presently being loaded. By pressing the area of touch screen where icon 132 is displayed, the operator can reset the truck load weight to zero when commencing to load a new truck which also provides a count of the truck that have been loaded.

When the shovel is swinging from the digging site to a truck that is being loaded, the operator may need quick access to the brake control subsections 104 on the control display 100 of FIG. 5 in order to stop a shovel function in an emergency or other urgent situation. As a consequence, it is desirable that this information be displayed on the particular computer monitor 76 or 77 that is located on the side of the seat 84 most convenient for observation and manual activation during that swing. Ideally the brake controls in section 130 should be easily observable to the operator as the shovel is swinging from the digging site to the dump truck, i.e. this information should be displayed on the computer monitor 76 or 77 that is on the side of the operator seat 84 toward the dump truck when the power shovel is oriented at the digging site. Thus as the power shovel is swinging toward the truck, the operator is looking in the same general direction as the computer monitor 76 or 77 containing the control display 100. For example, this display location enables the operator to rapidly apply the brakes to avoid the power shovel 10 striking the truck. As a result, the operator's body does not have to pivot in order to activate a brake icon on the computer monitor, thereby reducing operator reaction time. Selecting the computer monitor in this manner also reduces operator fatigue and eye motion.

The indicator display 120 in FIG. 6 contains information which does not have to be accessed as quickly as the control display 100 and thus can be presented on the monitor located on the opposite side of the operator seat 84. In fact for some control systems, the weight of the dipper load may not be determined until after the load is dumped. The load weight is calculated by averaging a plurality of measurements of the force acting on the boom 24 in order to compensate for dynamic forces produced by dipper, crowd and boom motion. Because of the time required for those measurements and the subsequent calculation, the load weight may not be available for display until after the load has been dumped and the shovel begins to swing back to the digging site. Thus, the indicator display depicted in FIG. 6 can be presented on the computer monitor 76 or 77 that is on the side of the operator seat 84 toward the digging site when the power shovel is oriented at the dump truck. That display location permits the operator to easily observe the load data while looking toward the digging site as the power shovel swings back from dumping a load into a truck. Alternatively, if the control system is able to calculate the dipper load weight while the power shovel is swinging toward the truck, that information may be presented on the control display 100.

Figure 7:
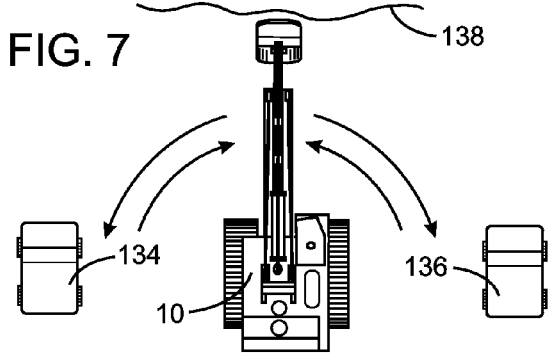
FIG. 7 is an overhead view showing a shovel positioned to dig into an earth bank with two trucks positioned for loading.

In different digging situations depicted in FIG. 7, a dump truck 134 or 136 may drive to a loading position that is on either the right or left of the power shovel 10 in the positioned, as illustrated to dig into an earth bank 138. As a result, some times it is desired to present the control display 100 in FIG. 6 on the first computer monitor 76 at the left side of the operator seat 84 when the truck is on that side of the power shovel, and when the truck is on the opposite side of the power shovel, it is desired to use the second computer monitor 77 at the right side of the operator seat. Therefore, the operator controller 72 in FIG. 2 provides the operator with the option of dynamically selecting which of the first and second computer monitors 76 and 77 this set of control information should be displayed. This selection can be made by the operator positioning a switch 75 on the console 88 or other location within close proximity to the operator seat. In one switch position the information on the control display 100 is presented on the first computer monitor 76, while in the other switch position it is presented on the second computer monitor 77.

Figure 8:
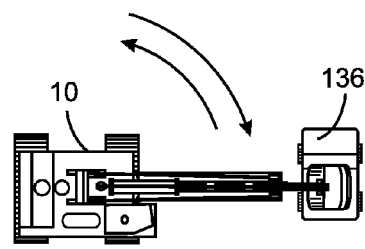
FIG. 8 is an overhead view showing a shovel positioned to dump a load into a truck.

Alternatively, the selection as to which of the first and second computer monitors 76 and 77 contains the control display information and which computer monitor contains the indicator display information is made automatically by the operator controller 72. As noted previously, the first and second joystick 70 and 71 control the swinging of the power shovel body 18 about the crawler assembly 14, the vertical and horizontal motion of the dipper 28, and release the latch of the dipper door 27. In response to receiving the joystick signals, the operator controller 72 is able to determine the relative swing position of the power shovel at which the dipper door 27 is released to load the dump truck. In other words, the operator controller 72 can determine by observing the various signals from the first and second joysticks 70 and 71, whether shovel swings right or left from the digging site to the dump truck, for example as shown in FIG. 8, and then the direction back to the digging site at which the dipper is lowered to dig into the ground, as shown in FIG. 7. From that swing direction determination, the operator controller 72 also can decide which of the first or second computer monitors 76 or 77 should display the control display information to the operator. As an alternative to using the joystick signals, the swing direction can be detected by a sensor that responds to motion between the body 18 and the crawler assembly 14.

Figure 9:
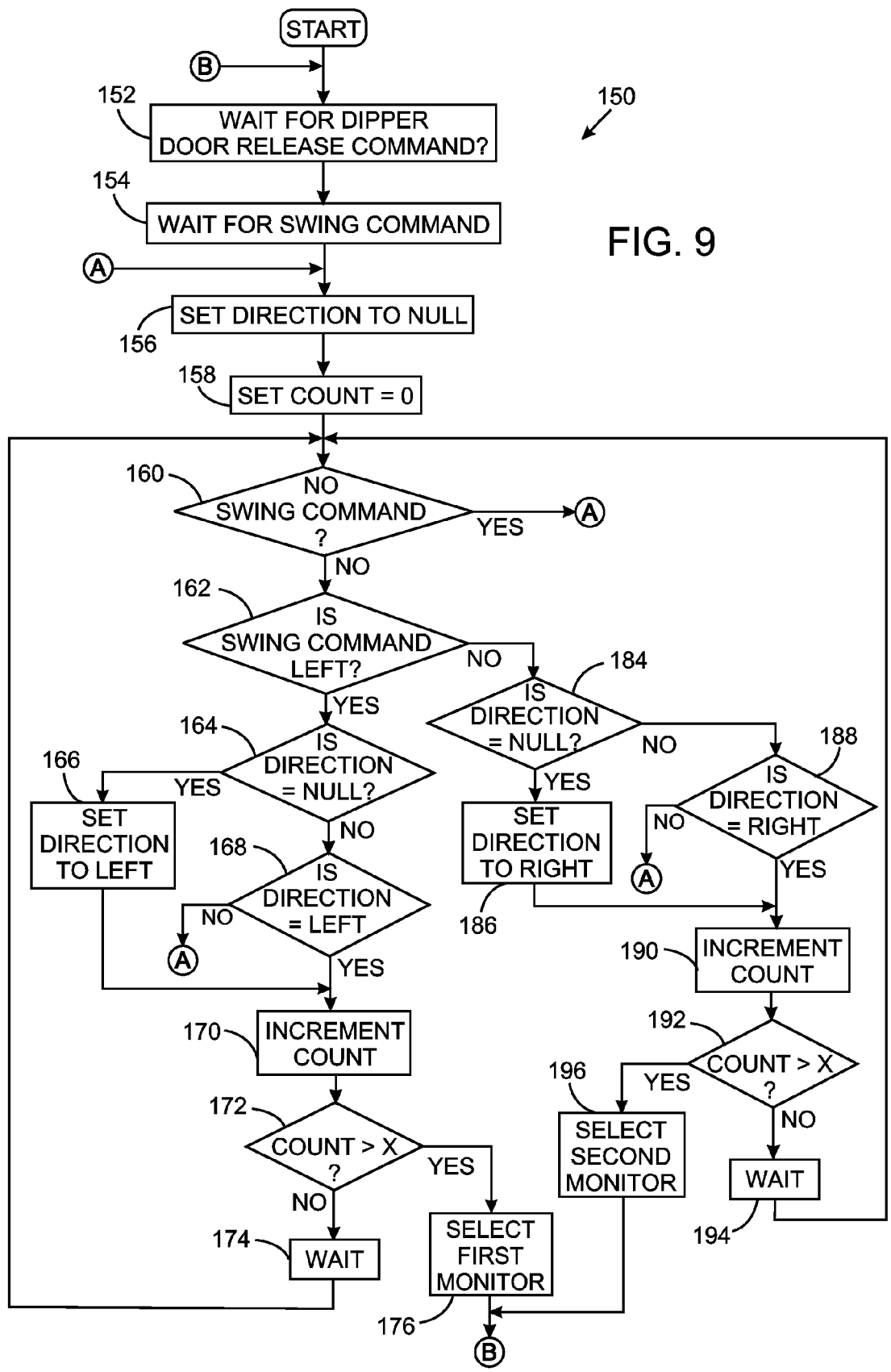
FIG. 9 is a flowchart of a software routine for controlling the information presented on the two display device.

FIG. 9 is a flow chart of a monitor selection routine 150 implemented in software executed by the operator controller 72 to automatically determine on which computer monitor 76 or 77 the control display 100 should be presented. The monitor selection routine 150 commences at step 152 where the execution waits for the operator controller 72 to receive a signal from the appropriate joystick 70 or 71 indicating that the dipper door latch should be released to dump a load. When this occurs, the program execution advances to step 154 to wait for a command from the appropriate joystick indicating that the body of the power shovel is to swing about the crawler assembly 14. This action occurs after the dipper load has been dumped into the dump truck and the power shovel 10 is returning to the position at which digging occurs, that is the shovel is making a return swing. Upon receipt of the swing command, the monitor selection routine 150 advances to step 156 at which a variable designated DIRECTION is set to the null value and then at step 158 another variable designated COUNT is set to zero.

In order for the operator controller 72 to determine which of the first or second computer monitor 76 or 77 is to display what type of information, a swing operation must occur for a predefined period of time to exclude switching the display information in response to a spurious short swing. Therefore, after step 158, the monitor selection routine 150 enters a section through which the execution must loop for that predefined period of time before a change in the assignment of information to the computer monitors can occur. The section commences at step 160 where a determination is made whether the swing command is still occurring. This step causes a jump from the execution loop if the swing does not last for the predefined period of time. Assuming that the swing command is still active, the routine execution advances to step 162 at which the swing command is inspected to determine whether it is designating a leftward return swing. If that is true, step 164 is executed to detect whether the DIRECTION variable is null, as during the first pass through this section of the monitor selection routine 150. If so, the DIRECTION variable is set to indicate a left return swing at step 166 before advancing to step 170. Otherwise if the DIRECTION value is not null, the program branches to step 168 at which a determination is made whether the DIRECTION variable is already set to indicate a left return swing. The DIRECTION variable could be set to indicate a right return swing, if the shovel was rotating right and then quickly reversed to the left direction. In that situation, the DIRECTION variable must be changed to indicate a current leftward swing and the value of the COUNT variable, indicating the number of passes through the lower section of the monitor selection routine, must be reset to zero. As a consequence if the DIRECTION variable is found indicating a rightward swing at step 168, the program execution jumps back to step 156 to reset the DIRECTION and COUNT variables before continuing. Otherwise if the DIRECTION variable previously was correctly set to indicate a swing to the left, the execution advances to step 170.

At step 170, the COUNT variable is incremented to indicate another pass through the lower portion of the monitor selection routine 150 before the count is inspected at step 172. The value of the COUNT variable indicates the period of time that the swing has been occurring in the same direction. If that variable does not indicate a sufficiently long swing duration in term of execution passes, the process advances to step 174 to wait a given amount of time before returning to step 160 to commence another pass through this section of the monitor selection routine. If the swing continues in the same direction for a long enough period of time, the COUNT variable will reach the predefined value and the program execution branches from step 172 to step 176. At this juncture the first computer monitor 76 on the left side of the operator seat 84 is selected for the information on the indicator display 120 as that monitor is toward the earth bank 138 and away from the truck. Therefore, when the power shovel completes another digging operation and is swinging rightward to the truck, the control display 100 will be on the right, or second computer monitor 77 in the direction of that swing. Thereafter, the program execution jumps back to step 152 to await another dipper door release command.

If at step 162 the recently received swing command indicates a rightward return swing, the program execution advances to step 184 and enters a program branch comprising steps 184-196 that correspond respectively to the previously described steps 164-176 except for responding to a shovel swing to the right. Specifically, at step 184, the DIRECTION variable is checked to determine if it is null in which event the program execution advances to step 186 where that variable is set to indicate a rightward swing. Otherwise, if the DIRECTION variable is not null, the process branches to step 188 where a check is made whether the swing has been occurring in the same direction. If not, the process returns to step 156 because a direction change occurred. At step 190, the COUNT variable is incremented and checked at step 192 to determine if the swing has been occurring for a sufficient period of time. If that is not the case, the process waits at step 194 for a fixed amount of time before returning to step 160 to repeat this execution loop. When the shovel swings in the rightward direction for a sufficiently long period of time, as defined by the loop count exceeding a value of X, step 196 is executed to select the second computer monitor 77 on the right side of the operator seat 84 for presenting the information on the indicator display 120, as that monitor is toward the earth bank 138 and away from the truck. Therefore, when the power shovel completes another digging operation and is swinging leftward to the truck, the control display 100 will be on the left, or second computer monitor 77 in the direction of that swing.

The computer monitor that is thereby selected for the control display 100 is the one on the side of the operator seat 84 to which the operator is generally looking during the swing of the shovel from the digging site to the dump truck. Therefore controls that are critical to safe operation of the power shovel 10 are displayed on the computer monitor most easily observed and activated during the swing toward the truck.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. An operator display system for an excavator that swings left and right between a digging site and a dumping site, wherein the excavator has an operator seat; said operator display system comprising:
    a first display device located on a first side of the operator seat;
    a second display device, separate from the first display, and located on a second side opposite the first side of the operator seat;
    a control system connected to the first display device and the second display device and generating a first set of information related to operation of the excavator and a second set of information related to operation of the excavator; and
    an arrangement for responding to an input signal by dynamically selecting on which of the first and second display devices the first set of information is displayed and on which of the first and second display devices the second set of information is simultaneously displayed, wherein the input signal indicates the excavator swing to the right or to the left and
    wherein when the input signal indicates the excavator swing to the right, the arrangement selects the first display device to display the first set of information and the second display device to display the second set of information; and when the input signal indicates the excavator swing to the left, the arrangement selects the second display device to display the first set of information and the first display device to display the second set of information.

2. The operator display system as recited in claim 1 wherein the excavator further includes a control device that is manually operable by a person to cause the excavator to swing left and cause the excavator to swing right, wherein the input signal is additionally produced in response to the control device.

3. The operator display system as recited in claim 1 wherein the excavator has a load carrier, and the input signal is additionally produced in response to at least one of a load being placed onto the load carrier and a load being removed from the load carrier.

4. The operator display system as recited in claim 3 wherein the input signal is additionally produced in response to a direction that the excavator swings after the load has been removed from the load carrier.

5. The operator display system as recited in claim 1 further comprising a switch that is manually operable to provide the input signal.

6. The operator display system as recited in claim 1 wherein the control system further comprises a sensor for producing a signal corresponding to weight of a load carried by the excavator; and the first set of information includes an indication of the weight of the load.

7. The operator display system as recited in claim 6 wherein the control system sums the weight of a plurality of loads to produce an indication of an aggregate weight of material; and the second set of information includes the indication of the aggregate weight of material.

8. The operator display system as recited in claim 1 wherein each of the first display device and the second display device comprises a touch screen.

9. The operator display system as recited in claim 8 wherein the first set of information comprises at least one icon denoting an area of the touch screen that when touched by an operator controls a function of the excavator.

10. The operator display system as recited in claim 8 wherein the second set of information comprises indicators denoting statuses of excavator functions.

11. A method for controlling an operator display system on an excavator that swings left and right between a digging site and a dumping site, wherein the excavator has an operator seat, a first display device located on a first side of the operator seat, and a second display device, separate from the first display device, located on a second side opposite the first side of the operator seat, said method comprising:
    generating a first set of information related to operation of the excavator;
    generating a second set of information related to operation of the excavator;
    producing an input signal, wherein the input signal indicates the excavator swing to the right or to the left;
    responding to the input signal by dynamically selecting on which of the first and second display devices the first set of information is displayed and on which of the first and second display devices the second set of information is simultaneously displayed, wherein when the input signal indicates the excavator swing to the right, responding to the input signal selects the first display device to display the first set of information and the second display device to display the second set of information; and when the input signal indicates the excavator swing to the left, responding to the input signal selects the second display device to display the first set of information and the first display device to display the second set of information.

12. The method as recited in claim 11 further comprising producing the input signal additionally in response to a load being removed from a load carrier of the excavator.

13. The method as recited in claim 11 further comprising manually operating an input device and producing the input signal additionally in response to operation of the input device.

14. The method as recited in claim 11 further comprising sensing weight of a load carried by the excavator; and the generating a second set of information utilizes the weight of the load.

15. The method as recited in claim 11 wherein generating a first set of information includes at least one icon specifying a function of the excavator; and further comprising operating the function of the excavator in response to an operator touching the first display device or the second display device on which the second set of information is displayed.

16. The method as recited in claim 15 wherein the first set of information is displayed on the one of the first display device and the second display device that is on the side of the operator seat toward which the excavator is swinging.

* * * * *